C. W. HEATH.
SHOCK ABSORBER FOR MOTOR CYCLES.
APPLICATION FILED OCT. 6, 1913.
1,104,501. Patented July 21, 1914.
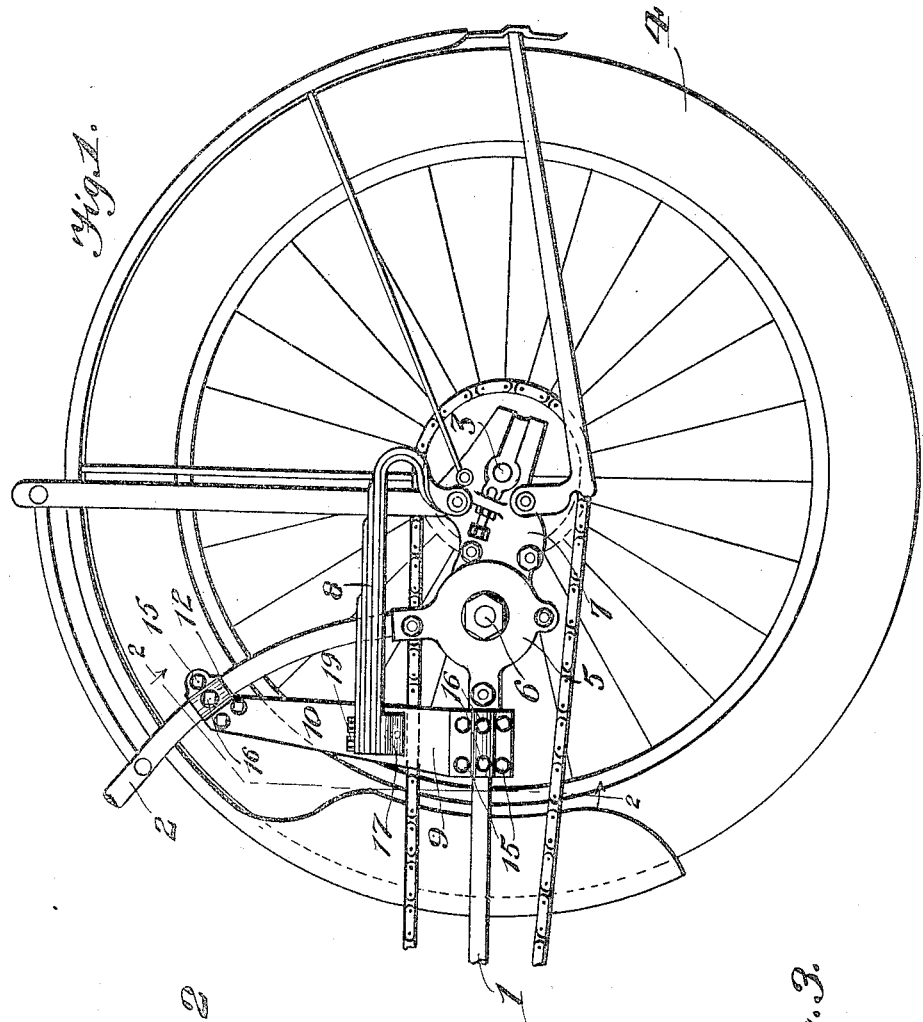
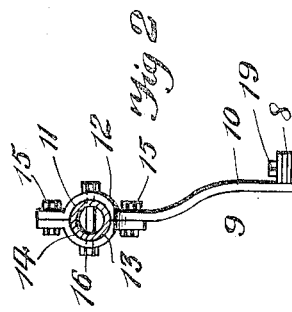
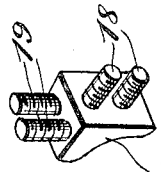
Inventor
Charles W. Heath
Witnesses
M. E. Ule.
W. C. Linton
By William C. Linton.
Attorney

UNITED STATES PATENT OFFICE.

CHARLES W. HEATH, OF SIOUX FALLS, SOUTH DAKOTA.

SHOCK-ABSORBER FOR MOTOR-CYCLES.

1,104,501.

Specification of Letters Patent.  Patented July 21, 1914.

Application filed October 6, 1913. Serial No. 793,553.

*To all whom it may concern:*

Be it known that I, CHARLES W. HEATH, a citizen of the United States, residing at Sioux Falls, in the county of Minnehaha and State of South Dakota, have invented new and useful Improvements in Shock-Absorbers for Motor-Cycles, of which the following is a specification.

The present invention relates to improvements in shock absorbers for motorcycles and more particularly to a support adapted to be used in connection therewith.

An object of the invention is to provide means for supporting the leaf springs of shock absorbers to the frame of a motorcycle or like vehicle which will be neat in appearance, strong, durable, and reliable when in use.

Another object is to provide supports of this character having the parts thereof adapted to be readily assembled and applied to the frame of the motorcycle and which will be comparatively cheap in the cost of manufacture, thereby rendering the same commercially desirable.

The invention consists of a pair of detachable supports adapted to be readily applied to the frame of a motorcycle or the like, each being provided with means for detachably securing the stationary ends of the leaf springs which take up the shocks and jars of the motorcycle when passing over rough and uneven roads.

The invention further consists of the novel features of construction, combination and arrangement of parts as will be hereinafter more fully described and particularly pointed out in the appended claims.

The invention will be best understood by having reference to the accompanying drawings taken in connection with the following detailed description forming part of the specification in which—

Figure 1, is a detail side elevation of the road frame of a motorcycle provided with a shock absorber having my invention applied thereto. Fig. 2, is a side elevation of one of my improved supports taken on the line 2—2 of Fig. 1, and, Fig. 3, is a detail perspective view.

Referring now to the accompanying drawing wherein one form of the present invention is disclosed, the numeral 1 indicates the lower fork and 2 the upper fork of the ordinary frame of a motorcycle to which is connected the rear axle 3, carrying the rear wheel 4 by means of my improved shock absorber as described and claimed in my co-pending application.

To better set forth the present invention I will briefly describe the shock absorber used in connection therewith, as follows: The rear forks 1 and 2, respectively, are connected to a pair of plates 5 which have pivotally connected thereto as at 6 the link 7, and the latter having adjustably secured thereto in the usual manner the rear axle 3 of the motorcycle. A leaf spring 8 is pivotally connected at its free end to the link 7 and its opposite end is detachably secured to a support 9, forming the subject matter of the present invention.

Whereas, I have shown and described the shock absorber and my improved support as applied to one side of the motorcycle frame it is to be understood that the same is to be duplicated on the opposite side of the frame.

My improved support comprises a body portion 10 formed of sheet metal being of greater width at its lower extremity, to insure durability, and having semi-circular recesses 11 formed adjacent to each end thereof for the reception of the forks 1 and 2, respectively, of the motorcycle frame. The upper end of the body portion of my support is provided with an angular extension 12 so that support may stand in a perpendicular direction when applied to the curved end of the upper fork 2.

Plates 13 each being provided with a recess 14 for the reception of the forks, are secured to the body portion of the supports by means of bolts 15, thereby forming sockets for retaining the support to the motorcycle frame. Bolts 16 extend through the said sockets and forks of the frame to insure a rigid connection which will prevent any displacement of the support which would result in the rear wheel becoming out of true.

A bracket 17 is detachably secured to the outer face of the plate 10 by means of a pair of integral bolts 18. And the stationary end of the leaf spring 8 is detachably secured to the upper face of the bracket by means of a pair of vertical integral bolts 19.

From the foregoing it is obvious that the various parts of the support may be readily taken apart and assembled should they become worn or broken. It will also be noted that by providing a support that extends in a vertical direction between the forks of the frame it will permit longer leaf springs to be used, which will have a greater leverage, thereby taking up the shocks and jars, which will make the riding of such vehicles much more comfortable.

Having fully described my invention, what I claim as new and desire to secure by Letters Patent is:—

1. The combination with a forked vehicle frame having the rear axle pivotally connected thereto, and a spring connected at one end to the axle, of a support connecting the forks, the vehicle frame and the opposite end of the spring being connected to said support.

2. The combination with a forked vehicle frame having the rear axle pivotally connected thereto, of a vertical support detachably secured to the forks of the frame, a leaf spring connected at one end to the axle and the opposite end of said spring being detachably secured to said support.

3. A shock absorber for vehicles, the combination with a forked frame, having an axle pivotally connected thereto, of a support, means of detachably connecting the extremities of the support to the forks of the frame, a bracket detachably connected to the support, a leaf spring connected at one end to the axle and the opposite end thereof being detachably connected to the said bracket.

In witness whereof, I hereunto subscribe my name to this specification in the presence of two witnesses.

CHARLES W. HEATH.

Witnesses:
E. B. SKINNER,
M. C. HEATH.